United States Patent
Asao

[19]

[11] Patent Number: 6,107,719
[45] Date of Patent: Aug. 22, 2000

[54] ROTOR FOR AN AUTOMOTIVE ALTERNATOR

[75] Inventor: Yoshihito Asao, Tokyo, Japan

[73] Assignee: Mitsubishi Denki Kabushiki Kaisha, Tokyo, Japan

[21] Appl. No.: 09/281,058

[22] Filed: Mar. 10, 1999

[30] Foreign Application Priority Data

Sep. 4, 1998 [JP] Japan .................................. 10-251491

[51] Int. Cl.$^7$ ........................... H02K 15/00; H02K 1/00; H02K 3/00; H02K 19/26; H02K 1/22
[52] U.S. Cl. ......................... 310/261; 310/269; 310/179; 310/263; 310/180; 310/194; 310/208; 310/261; 310/42
[58] Field of Search ..................................... 310/269, 179, 310/263, 180, 194, 208, 261, 42

[56] References Cited

FOREIGN PATENT DOCUMENTS 0139066  10/1980  Japan .
2-243468  9/1990  Japan .

*Primary Examiner*—Clayton LaBalle
*Assistant Examiner*—Guillermo Perez

*Attorney, Agent, or Firm*—Sughrue, Mion, Zinn, Macpeak & Seas, PLLC

[57] ABSTRACT

A rotor for an automotive alternator comprises a cylindrical bobbin having a cylindrical portion, a pair of first and second annular flange portions projecting perpendicularly from both ends of the cylindrical portion, a recessed groove disposed at an angle to the radial direction in the inner wall of the first flange portion, and an anchor portion disposed on an outer circumferential portion of the first flange portion in close proximity to the outer circumferential end of the recessed groove, the bobbin being fitted over the base portions of the pair of field cores; and a field winding wound a predetermined number of turns into multiple layers on the cylindrical portion of the bobbin, wherein the field winding has a flat shape, the starting end of the field winding being wound around the anchor portion and housed in the recessed groove, then drawn from the inner circumferential end of the recessed groove onto the outer circumferential surface of the cylindrical portion of the bobbin, and additionally taken across the outer circumferential surface of the cylindrical portion of the bobbin from the first flange portion to the second flange portion, and thereafter being wound onto the outer circumferential surface of the cylindrical portion of the bobbin at an angle relative to a plane which perpendicularly intersects the axial center of the bobbin.

8 Claims, 3 Drawing Sheets

ROTOR FOR AN AUTOMOTIVE ALTERNATOR

BACKGROUND OF THE INVENTION

1. Field of the Invention

The present invention relates to a rotor for an automotive alternator, which has a Lundell-type core, for mounting on an automobile engine, and in particular, relates to a winding configuration for winding onto the Lundell-type field core.

2. Description of the Related Art

FIG. 2 is a cross-section of a conventional rotor for an automotive alternator and FIG. 3 is a cross-section of part of the rotor shown in FIG. 2.

In FIGS. 2 and 3, a rotor 1 comprises a rotating shaft 11 rotatably supported by a pair of brackets (not shown), a pair of Lundell-type field cores 12a, 12b secured to the rotating shaft 11, a pair of fans 13a, 13b secured to both axial ends of the field cores 12a, 12b, slip rings 14 secured to one end of the rotating shaft 11, and a field winding 15 wound onto the field cores 12a, 12b.

The field cores 12a, 12b are made of iron, comprise cylindrical base portions 121a, 121b fitted over and secured to the rotating shaft 11 and claw-shaped magnetic poles 122a, 122b plurally projecting from the outer circumferential edges of the base portions 121a, 121b, and are secured to the rotating shaft 11 facing each other such that the end surfaces of the base portions 121a, 121b are in close contact with each other and the claw-shaped magnetic poles 122a, 122b intermesh alternately. The field winding 15 is a copper wire with a flat shape having a rectangular cross-section and is wound a predetermined number of times onto a bobbin 16 fitted over the outer circumferences of the base portions 121a, 121b. A magnetic flux is generated when an electric current is supplied to the field winding 15 by means of the slip rings 14 and magnetic poles are formed in the field cores 12a, 12b by the magnetic flux.

Inner circumferential tape 17a for protecting the winding is wound onto the cylindrical portion 16a of the bobbin 16. Outer circumferential tape 17c for protecting the winding is also wound onto the outer circumference of the field winding 15 wound onto the bobbin 16. In addition, side tape 17b is disposed between the lead portion of the field winding 15 and the multi-layered portion of the field winding 15.

The construction of the field winding 15 will now be explained with reference to FIG. 4.

The bobbin 16 is made of resin, and comprises a cylindrical portion 16a and a pair of first and second annular flange portions 16b projecting perpendicularly from both ends of the cylindrical portion 16a. A recessed groove 161 for housing a lead wire 15a at the start of the winding is disposed at an angle with respect to the radial direction in the inner surface of the first flange portion 16b so as to extend from the outer circumferential side thereof to the cylindrical portion 16a. An anchor portion 16c is disposed on an outer circumferential portion of the first flange portion 16b in close proximity to the upper end of the recessed groove 161.

First, the inner circumferential tape 17a is wound onto the cylindrical portion 16a of the bobbin 16. Then, the starting portion of the field winding 15 is wound around the anchor portion 16c, inserted into the recessed groove 161, and drawn from the lower end (inner circumferential end) of the recessed groove 161 onto the cylindrical portion 16a. At this point, the side tape 17b is pasted onto the inner surface of the first flange portion 16b so as to cover the lead wire 15a at the start of the field winding 15 which is housed in the recessed groove 161. Then, the field winding 15 drawn out onto the cylindrical portion 16a is lined up in rows at an angle relative to a plane which perpendicularly intersects the axial center of the bobbin 16 as it is wound onto the cylindrical portion 16a. Then, when the first layer of the winding is finished, a second layer is lined up in rows at an angle relative to the plane which perpendicularly intersects the axial center as it is wound onto the cylindrical portion 16a. In this way, the field winding 15 is wound up layer by layer in order from the bottom of the cylindrical portion 16a, and when a predetermined number of layers have been wound, the outer circumferential tape 17c is wound onto the outermost circumferential portion. In addition, the multi-layered portion of the field winding 15 is saturated with varnish.

The starting portion of the field winding 15 will now be explained.

The broad surface of the flatly shaped lead wire 15a is housed in the recessed groove 161 so as to closely contact the bottom of the recessed groove 161. In other words, the broad surface of the lead wire 15a lies on a plane which intersects the axial center of the bobbin 16 perpendicularly. The outer circumferential surface of the cylindrical portion 16a of the bobbin 16, on the other hand, is parallel to the axial center of the bobbin 16.

Thus, the field winding 15, whose broad surface lies on a plane which intersects the axial center of the bobbin 16 perpendicularly, is bent at a right angle towards the cylindrical portion 16a at the inner circumferential end of the recessed groove 161, and is drawn out onto the outer circumferential surface of the cylindrical portion 16a. In addition, the field winding 15 drawn out onto the outer circumferential surface of the cylindrical portion 16a is twisted at approximately 90 degrees on the outer circumferential surface of the cylindrical portion 16a such that the longitudinal direction of the field winding 15 is at an angle relative to a plane which intersects the axial center of the bobbin 16 perpendicularly, and winding of the first layer is started.

In the conventional rotor 1 for an automotive alternator constructed in this manner, in the starting portion of the fieldwinding 15, the field winding 15 is bent at a right angle towards the cylindrical portion 16a at the inner circumferential end of the recessed groove 161, and is drawn out onto the outer circumferential surface of the cylindrical portion 16a, and in addition is twisted at approximately 90 degrees on the outer circumferential surface of the cylindrical portion 16a such that the longitudinal direction thereof is at an angle relative to a plane which intersects the axial center of the bobbin 16 perpendicularly. However, the field winding has a flat shape and therefore cannot completely absorb the kinks caused by bending and twisting, and kinks arise in the starting portion of the field winding 15.

Thus, one problem is that the second and subsequent layers of the field winding 15 are wound over the kinks, leading to damage in the starting portion of the field winding 15. Furthermore, the starting portion of the field winding 15 is the bottommost layer in the multi-layer portion and damage to the wire is difficult to detect there, leading to quality control problems.

Another problem is that the angle of the bending and twisting of the field winding 15 at the inner circumferential end of the recessed groove 161 is great, reducing workability as well as giving rise to wire breakages.

SUMMARY OF THE INVENTION

The present invention aims to solve the above problems and an object of the present invention is to provide a rotor for an automotive alternator which enables quality to be stabilized as well as improving workability by suppressing the occurrence of damage to wire caused by winding successive layers of a field winding and suppressing the occurrence of breakages by reducing the angle of bending and twisting and minimizing kinks in the starting portion of the flatly shaped field winding.

In order to achieve the above object, according to one aspect of the present invention, there is provided a rotor for an automotive alternator comprising a pair of field cores each having a cylindrical base portion and a plurality of claw-shaped magnetic poles projecting from the outer circumferential edges of the base portions, the field cores being secured to a rotating shaft facing each other such that the end surfaces of the base portions are in close contact with each other and the claw-shaped magnetic poles intermesh with each other, a cylindrical bobbin having a cylindrical portion, a pair of first and second annular flange portions projecting perpendicularly from both ends of the cylindrical portion, a recessed groove disposed at an angle to the radial direction in the inner wall of the first flange portion, and an anchor portion disposed on an outer circumferential portion of the first flange portion in close proximity to the outer circumferential end of the recessed groove, the bobbin being fitted over the base portions of the pair of field cores, and a field winding wound a predetermined number of turns into multiple layers on the cylindrical portion of the bobbin, wherein the field winding has a flat shape, the starting end of the field winding being wound around the anchor portion and housed in the recessed groove, then drawn from the inner circumferential end of the recessed groove onto the outer circumferential surface of the cylindrical portion of the bobbin, and additionally taken across the outer circumferential surface of the cylindrical portion of the bobbin from the first flange portion to the second flange portion, and thereafter being wound onto the outer circumferential surface of the cylindrical portion of the bobbin at an angle relative to a plane which perpendicularly intersects the axial center of the bobbin.

DETAILED DESCRIPTION OF THE PREFERRED EMBODIMENT

The preferred embodiment of the present invention will now be explained with reference to the drawings.
Embodiment 1

Figure 1:
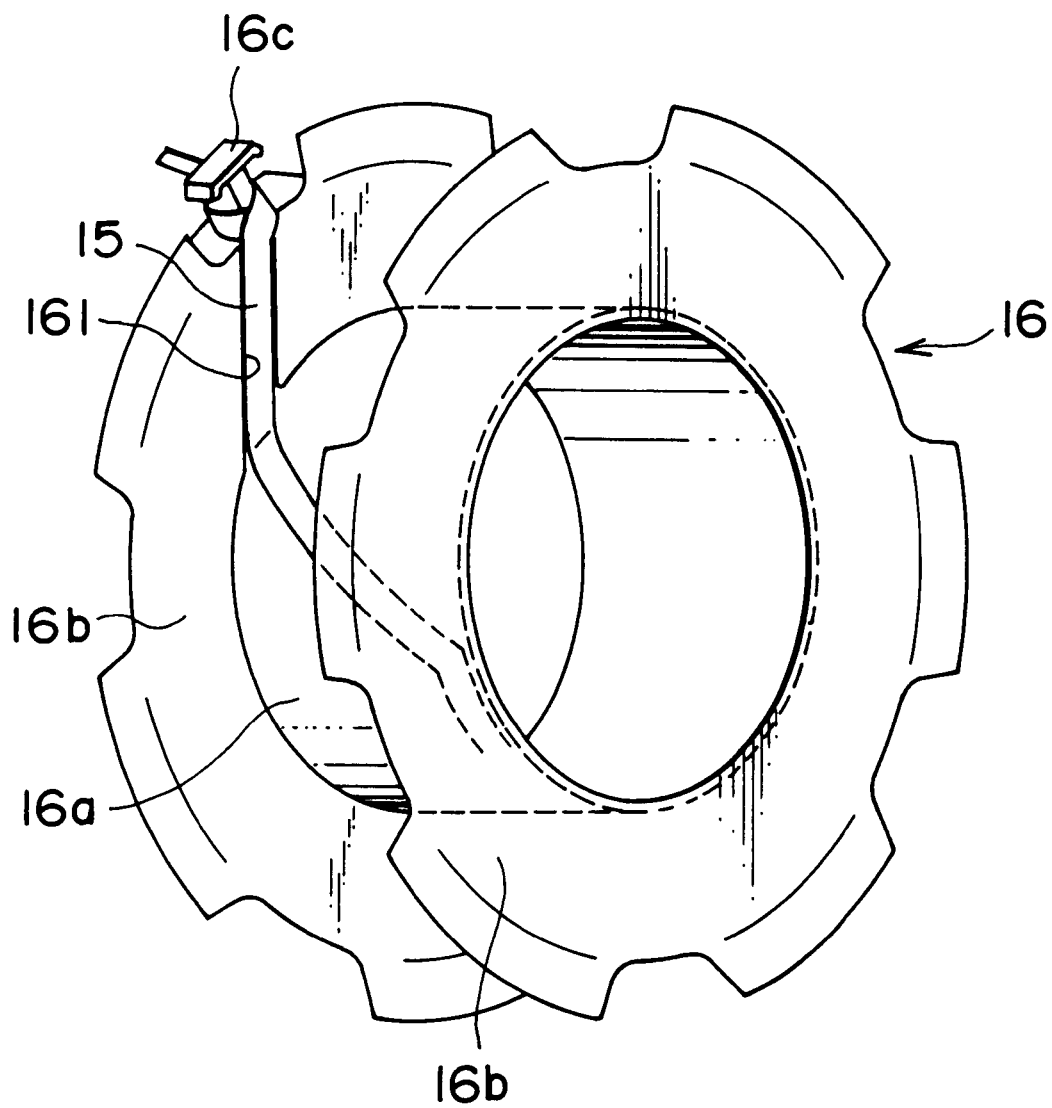
FIG. 1 is a perspective view explaining the winding configuration of a field winding in a rotor for an automotive alternator according to Embodiment 1 of the present invention.

FIG. 1 is a perspective view explaining the winding configuration of a field winding in a rotor for an automotive alternator according to Embodiment 1 of the present invention.

In FIG. 1, the field winding 15 is a flatly shaped copper wire which has a rectangular cross-section. Furthermore, the bobbin 16 is made of resin, and comprises a cylindrical portion 16a and a pair of first and second annular flange portions 16b projecting perpendicularly from both ends of the cylindrical portion 16a. A recessed groove 161 for housing a lead wire 15a at the start of the winding is disposed at an angle with respect to the radial direction in the inner surface of the first flange portion 16b so as to extend from the outer circumferential side to the cylindrical portion 16a. An anchor portion 16c is disposed on an outer circumferential portion of the first flange portion 16b in close proximity to the outer circumferential end of the recessed groove 161.

The winding configuration of the field winding 15 according to Embodiment 1 will now be explained.

First, the inner circumferential tape 17a is wound onto the cylindrical portion 16a of the bobbin 16. Then, the starting portion of the field winding 15 is wound around the anchor portion 16c, inserted into the recessed groove 161, and drawn from the inner circumferential end of the recessed groove 161 onto the cylindrical portion 16a. At this point, the side tape 17b is pasted onto the inner surface of the first flange portion 16b so as to cover the lead wire 15a at the start of the field winding 15 which is housed in the recessed groove 161. The field winding 15 drawn out onto the cylindrical portion 16a is taken across the outer circumferential surface of the cylindrical portion 16a from the first flange portion 16b to the second flange portion 16b at a predetermined angle relative to a plane which perpendicularly intersects the axial center of the cylindrical portion 16a. Then, the field winding 15 taken across to the root portion of the second flange portion 16b is lined up in rows at an angle relative to a plane which perpendicularly intersects the axial center of the bobbin 16 as it is wound onto the cylindrical portion 16a. When the first layer of the winding is finished, a second layer is lined up in rows at an angle relative to the plane which perpendicularly intersects the axial center as it is wound onto the cylindrical portion 16a. In this way, the field winding 15 is wound up layer by layer in order from the bottom of the cylindrical portion 16a, and when a predetermined number of layers have been wound, the outer circumferential tape 17c is wound onto the outermost circumferential portion. In addition, the multi-layered portion of the field winding 15 is saturated with varnish.

The starting portion of the field winding 15 according to Embodiment 1 will now be explained.

The broad surface of the flatly shaped lead wire 15a is housed in the recessed groove 161 so as to closely contact the bottom of the recessed groove 161.

In other words, the broad surface of the lead wire 15a lies on a plane which intersects the axial center of the bobbin 16 perpendicularly. The outer circumferential surface of the cylindrical portion 16a of the bobbin 16, on the other hand, is parallel to the axial center of the bobbin 16.

Thus, the field winding 15, whose broad surface lies on a plane which intersects the axial center of the bobbin 16 perpendicularly, is bent at a right angle towards the cylindrical portion 16a at the inner circumferential end of the recessed groove 161, and is drawn out onto the outer circumferential surface of the cylindrical portion 16a. In addition, the field winding 15 drawn out onto the outer circumferential surface of the cylindrical portion 16a is twisted on the outer circumferential surface of the cylindrical portion 16a and taken across the outer circumferential surface of the cylindrical portion 16a from the first flange portion 16b to the second flange portion 16b. Then, the field winding 15 taken across to the root portion of the second flange portion 16b is twisted on the outer circumferential surface of the cylindrical portion 16a such that the longitudinal direction of the field winding 15 is at an angle relative to a plane which intersects the axial center of the bobbin 16 perpendicularly, and winding of the first layer is started.

Figure 2:
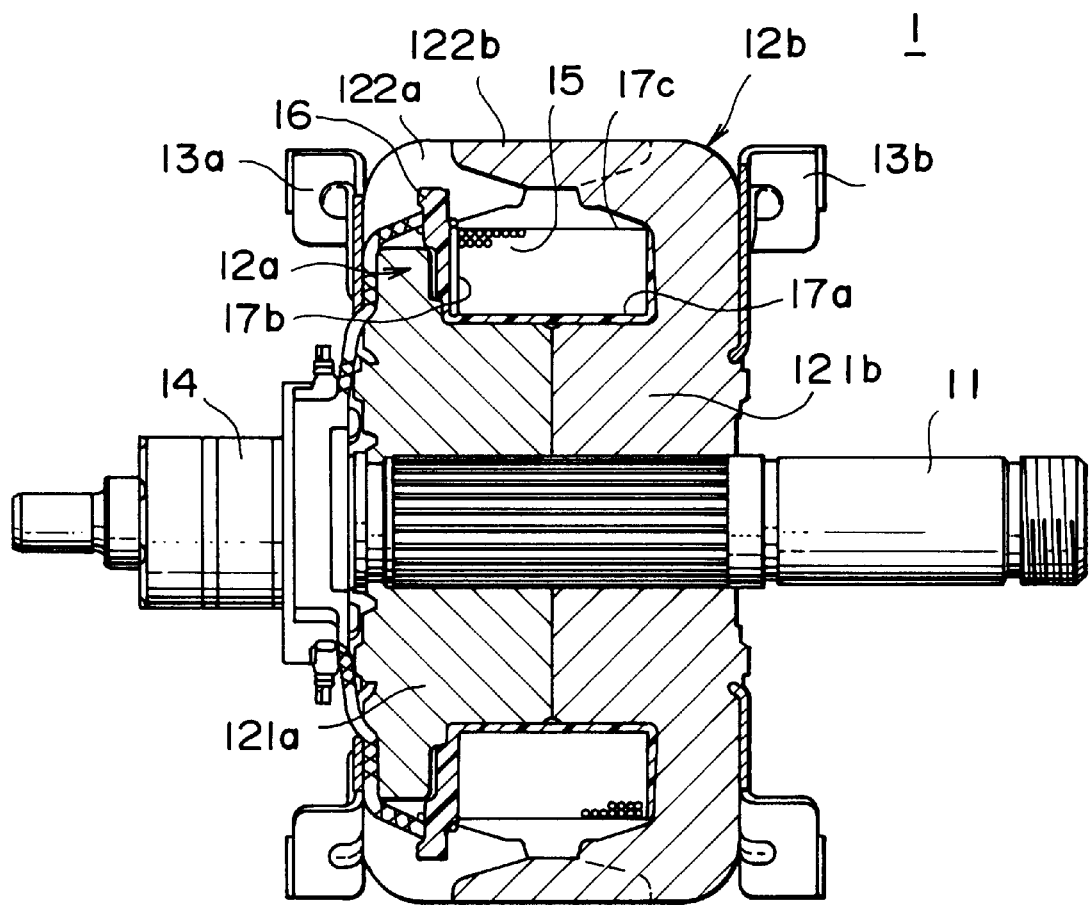
FIG. 2 is a cross-section of a conventional rotor for an automotive alternator.
Figure 3:
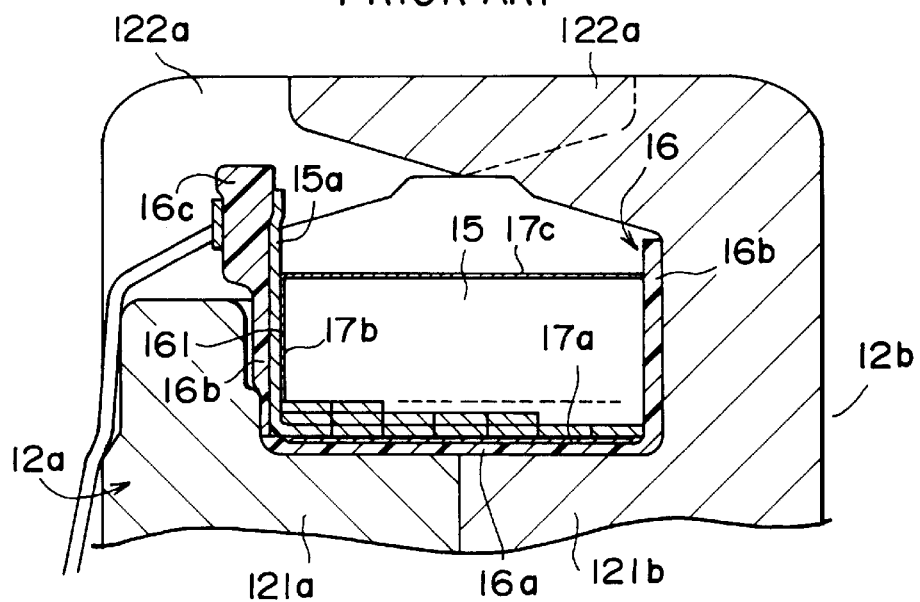
FIG. 3 is a partial cross-section of the conventional rotor for an automotive alternator.
Figure 4:
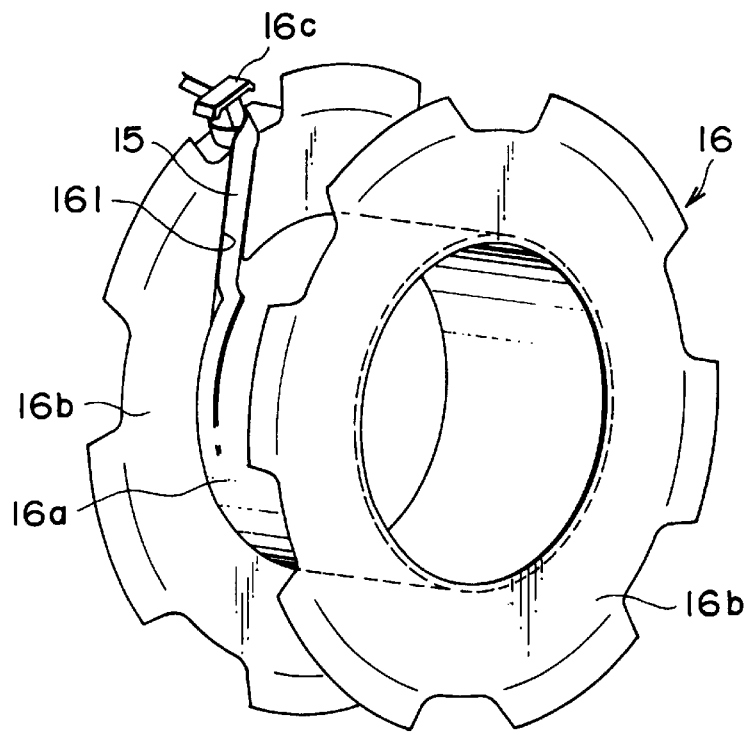
FIG. 4 is a perspective view explaining the winding configuration of a field winding in the conventional rotor for an automotive alternator.

Moreover, the rest of the construction is the same as for the conventional rotor shown in FIGS. 2 and 3.

In a rotor constructed in this manner, the end of the portion of the field winding 15 taken across is positioned in front of the inner circumferential end of the recessed groove 161 in the direction of winding. Furthermore, the direction which the field winding is twisted in at the portion where the field winding 15 is drawn out from the inner circumferential end of the recessed groove 161 onto the cylindrical portion 16a is the same as the direction which the field winding is twisted in at the end of the portion of the field winding 15 taken across.

Thus, the bending and twisting of the wire in the starting portion of the field winding 15 is distributed to two positions, the portion where the field winding 15 is drawn out from the inner circumferential end of the recessed groove 161 onto the cylindrical portion 16a and the end of the portion of the field winding 15 taken across, enabling the angle of bending and twisting of the wire to be reduced at each position.

As a result, kinks in the wire resulting from bending and twisting are reduced significantly compared to the conventional technique, providing a rotor with stable quality in which the second and subsequent layers of the field winding can be wound on top of the kinked portions without giving rise to damage in the starting portion of the field winding 15.

Furthermore, stresses generated in the bent and twisted portions of the wire as a result of the bending and twisting are reduced, minimizing the occurrence of breakages in the wire.

In addition, the bending and twisting work is facilitated, improving the winding operation.

Furthermore, since a flatly shaped field winding 15 is used, spacing between portions of the field winding 15 in the radial direction is practically reduced to zero, increasing rigidity, improving resistance to vibrations, and enabling the occurrence of disarray in the winding to be suppressed. Similarly, thermal conductivity between portions of the field winding 15 is improved and radiation of heat increases, enabling high-output to be attained. In addition, the thickness of the field winding 15 is reduced and the field winding 15 can be wound to a high density, attaining reduced size and increased output.

Now, after the field winding 15 has been drawn out from the inner circumferential end of the recessed groove 161 onto the outer circumferential surface of the cylindrical portion 16a and taken across the outer circumferential surface of the cylindrical portion 16a from the first flange portion 16b to the second flange portion 16b, winding of the first layer is started. At that time, the field winding 15 is wound on top of the portion of the field winding 15 taken across, giving rise to irregularities in the outer circumference of the multi-layered portion. Moreover, if more than one lap is required to take the field winding 15 across the outer circumferential surface of the cylindrical portion 16a from the first flange portion 16b to the second flange portion 16b after the field winding 15 has been drawn out from the inner circumferential end of the recessed groove 161 onto the outer circumferential surface of the cylindrical portion 16a, the field winding 15 will be wound on top of the portion of the field winding 15 taken across at two or more places in the circumferential direction, increasing the number of irregularities arising in the outer circumference of the multi-layered portion. In other words, the outer circumference of the multi-layered portion of the field winding 15 will be less uniform in the axial direction, leading to eccentricities in the multi-layered portion. When the eccentricities in the multi-layered portion are large, there is a risk that vibrations will be induced in the rotor during high-speed rotation. From this, it is desirable that the field winding 15 is taken across the outer circumferential surface of the cylindrical portion 16a from the first flange portion 16b to the second flange portion 16b within one lap.

The present invention is constructed in the above manner and exhibits the effects described below.

According to one aspect of the present invention, there is provided a rotor for an automotive alternator comprising a pair of field cores each having a cylindrical base portion and a plurality of claw-shaped magnetic poles projecting from the outer circumferential edges of the base portions, the field cores being secured to a rotating shaft facing each other such that the end surfaces of the base portions are in close contact with each other and the claw-shaped magnetic poles intermesh with each other, a cylindrical bobbin having a cylindrical portion, a pair of first and second annular flange portions projecting perpendicularly from both ends of the cylindrical portion, a recessed groove disposed at an angle to the radial direction in the inner wall of the first flange portion, and an anchor portion disposed on an outer circumferential portion of the first flange portion in close proximity to the outer circumferential end of the recessed groove, the bobbin being fitted over the base portions of the pair of field cores, and a field winding wound a predetermined number of turns into multiple layers on the cylindrical portion of the bobbin, wherein the field winding has a flat shape, the starting end of the field winding being wound around the anchor portion and housed in the recessed groove, then drawn from the inner circumferential end of the recessed groove onto the outer circumferential surface of the cylindrical portion of the bobbin, and additionally taken across the outer circumferential surface of the cylindrical portion of the bobbin from the first flange portion to the second flange portion, and thereafter being wound onto the outer circumferential surface of the cylindrical portion of the bobbin at an angle relative to a plane which perpendicularly intersects the axial center of the bobbin, reducing the angle of bending and twisting and minimizing kinks in the starting portion of the field winding, thereby suppressing the occurrence of damage to the wire caused by winding successive layers of a field winding and suppressing the occurrence of breakages, and thus providing a rotor for an automotive alternator which enables quality to be stabilized as well as improving workability.

The field winding is taken across the outer circumferential surface of the cylindrical portion from the first flange portion to the second flange portion within one lap after being been drawn out from the inner circumferential end of the recessed groove onto the outer circumferential surface of the cylindrical portion of the bobbin, enabling the multi-layer portion of the field winding to be formed with a uniform outer circumference.

What is claimed is:

1. A rotor for an automotive alternator comprising:
   a pair of field cores each having a cylindrical base portion and a plurality of claw-shaped magnetic poles projecting from outer circumferential edges of said base portions, said field cores being secured to a rotating shaft and facing each other such that end surfaces of said base portions are in close contact with each other and said claw-shaped magnetic poles intermesh with each other;
   a cylindrical bobbin having a cylindrical portion, a pair of first and second annular flange portions projecting perpendicularly from both ends of said cylindrical portion, a recessed groove disposed in an inner wall of said first flange portion at an angle to a radial direction of said cylindrical portion, and an anchor portion disposed on an outer circumferential portion of said first flange portion in close proximity to an outer circumferential end of said recessed groove, said bobbin being fitted over said base portions of said pair of field cores; and a field winding wound a predetermined number of turns into multiple layers on said cylindrical portion of said bobbin, wherein said field winding has a flat shape, the starting end of said field winding being wound around said anchor portion and housed in said recessed groove, then drawn from an inner circumferential end of said recessed groove onto the outer circumferential surface of said cylindrical portion of said bobbin, and additionally taken across said outer circumferential surface of said cylindrical portion of said bobbin from said first flange portion to said second flange portion, and thereafter being wound onto said outer circumferential surface of said cylindrical portion of said bobbin at an angle relative to a plane which perpendicularly intersects the axial center of said bobbin.

2. The rotor for an automotive alternator according to claim 1, wherein said field winding is taken across said outer circumferential surface of said cylindrical portion from said first flange portion to said second flange portion within one lap after being been drawn out from said inner circumferential end of said recessed groove onto said outer circumferential surface of said cylindrical portion of said bobbin.

3. The rotor for an automobile alternator according to claim 1, wherein said field winding is taken across said outer circumferential surface of said cylindrical portion from said first flange portion to said second flange portion at an angle relative to a plane which perpendicularly intersects the axial center of said bobbin different from said angle at which said field winding is wound on said outer circumferential surface of said cylindrical portion.

4. A bobbin for use in an alternator comprising:

a cylindrical portion having an outer circumferential surface;

a pair of first and second annular flange portions projecting perpendicularly from both ends of said cylindrical portion;

a recessed groove disposed in an inner wall of said first flange portion and having an inner circumferential end meeting the outer circumferential surface of said cylindrical portion; and a field winding wound a predetermined number of turns into multiple layers on said cylindrical portion of said bobbin;

wherein said field winding has a flat shape, the starting end of said field winding being housed in said recessed groove, then drawn from the inner circumferential end of said recessed groove onto the outer circumferential surface of said cylindrical portion of said bobbin, and additionally taken across said outer circumferential surface of said cylindrical portion of said bobbin from said first flange portion to said second flange portion, and thereafter being wound onto said outer circumferential surface of said cylindrical portion of said bobbin at an angle relative to a plane which perpendicularly intersects the axial center of said bobbin.

5. The bobbin for use in an alternator according to claim 4, wherein said field winding is taken across said outer circumferential surface of said cylindrical portion from said first flange portion to said second flange portion within one lap after being drawn out from said inner circumferential end of said recessed groove onto said outer circumferential surface of said cylindrical portion of said bobbin.

6. The bobbin for use in an alternator according to claim 4, wherein said field winding is taken across said outer circumferential surface of said cylindrical portion from said first flange portion to said second flange portion at an angle relative to a plane which perpendicularly intersects the axial center of said bobbin different from said angle at which said field winding is wound onto said outer circumferential surface of said cylindrical portion.

7. The bobbin for use in an alternator according to claim 4, wherein said recessed groove is disposed at an angle to a radial direction of said cylindrical bobbin.

8. The bobbin for use in an alternator according to claim 4, further comprising an anchor portion disposed at an outer circumferential portion of said first flange portion in close proximity to an outer circumferential end of said recessed groove.

* * * * *